United States Patent [19]

Katarao

[11] 4,040,302
[45] Aug. 9, 1977

[54] CHAIN DRIVE FOR A TRANSFER MACHINE

[75] Inventor: Tadamichi Katarao, Hiroshima, Japan

[73] Assignee: Mitsubishi Jukogyo Kabushiki Kaisha, Japan

[21] Appl. No.: 538,267

[22] Filed: Jan. 3, 1975

[51] Int. Cl.² .............................................. F16H 19/06
[52] U.S. Cl. .......................................................... 74/37
[58] Field of Search ............................................. 74/37

[56] References Cited

U.S. PATENT DOCUMENTS

| 1,384,339 | 7/1921 | Powell | 74/29 |
| 2,309,578 | 1/1943 | Drachnian | 74/37 |
| 3,247,454 | 4/1966 | Gale et al. | 74/37 |
| 3,285,079 | 11/1966 | Homanick | 74/37 |
| 3,459,056 | 8/1969 | Lea | 74/29 |

FOREIGN PATENT DOCUMENTS

| 243,135 | 11/1925 | United Kingdom | 74/37 |

Primary Examiner—Samuel Scott
Assistant Examiner—Wesley S. Ratliff, Jr.
Attorney, Agent, or Firm—McGlew and Tuttle

[57] ABSTRACT

The chain drive comprises spaced parallel endless chains extending along a path, for transferring work-carrying pallets between work stations, with the transfer path including rectilinear sections connected by bends in the path. The chains are driven by a drive mechanism, located on a rectilinear portion of the transfer path, and including respective sprockets engaged with the chains and driving the chains at equal speeds, with the arc of contact of each chain with its associated sprocket being equal to that of the arc of contact of each other chain with its associated sprocket. At the drive unit, the chains engage spaced parallel rectilinear chain guides, and the pallets are guided along rectilinear guide rails. Each pallet is secured to a pair of spaced parallel endless chains.

4 Claims, 6 Drawing Figures

CHAIN DRIVE FOR A TRANSFER MACHINE

FIELD AND BACKGROUND OF THE INVENTION

This invention relates to a chain drive for a transfer machine which permits each workpiece to be smoothly transferred on a chain-driven pallet at a constant speed from one machine work station to another.

Transfer machines of automated assembly lines, conveyor lines and other such installations use chain drives as a means for moving work-carrying pallets through successive work stations. However, the conventional chain drives involve difficulties in smoothly and precisely transferring the pallets. This is particularly true with the large-size transfer machines of recent designs which demand increased power for the chain driving. In those machines, a plurality of chains, usually two in parallel, are driven at the same speed in a given direction so as to transfer a pallet bridging over the chains. It has been found that the individual chains being driven in the same way actually differ slightly in speed, the differential increasing in proportion to the period of service. Understandably, equality of the individual chain speeds is essential for smooth pallet conveying. Factors responsible for the differentiation of the chain speeds are as follows. At each bend or corner of the track formed by the chains of a transfer machine, sprockets must be provided to ensure the smooth movement of the chains. In practice, as shown in FIG. 1, those sprockets at the corner are utilized to drive the chains, the inner sprocket 21 driving the inner chain 23, and the outer sprocket 22 the outer chain 24. As shown, the inner chain provides more wrap on the inner sprocket 21 than does the outer chain on the outer sprocket 22, with a longer distance of engagement in the arc of contact therebetween than that between the outer couple. This tends to induce the stick-slip of the outer chain 24, a phenomenon in which the chain speed becomes too slow and too fast alternately and intermittently. Should the phenomenon occur, the slight difference resulting between the speeds of the individual chains will make the smooth pallet transfer no longer possible. Another adverse factor is the wear with use of the rollers and pins of the chains and that of the sprocket teeth. This will increase the chances of stick-slipping of the outer chain, with a greater contact pressure because of the less wrap on the outer sprocket than that of the inner chain on the inner sprocket. Especially on installations after extended service periods, the conveying conditions of the inner and outer chains for driving the pallets thereon will become unbalanced, making the smooth pallet transfer infeasible.

SUMMARY OF THE INVENTION

The present invention aims at overcoming the foregoing difficulties and permitting smooth work conveyance on transfer machines. The invention resides in a transfer machine wherein each pallet carrying a workpiece thereon is transferred from one station to another by a plurality of chains, characterized in that along straight sections of the chains there are provided sprockets in mesh therewith, and the chains are driven while equal lengths of engagement are maintained between the individual chains and the associated sprockets.

The above and other objects, advantages and features of the invention will become apparent from the following description taken in conjunction with the accompanying drawings showing a preferred embodiment thereof.

DESCRIPTION OF THE PREFERRED EMBODIMENT

Figure 1:
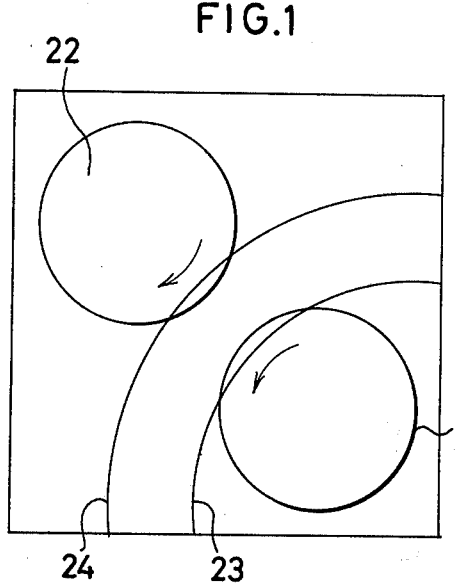
FIG. 1 is a schematic diagram illustrating the basic concept of a conventional chain drive.
Figure 2:
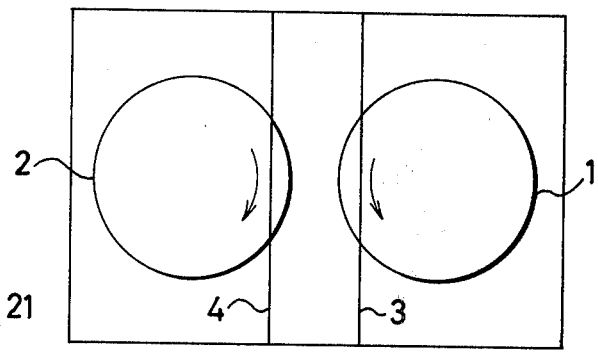
FIG. 2 is a schematic diagram illustrating the basic concept of the chain drive embodying the invention.

Referring now to FIG. 2, there is schematically shown a chain drive arrangement in accordance with the invention for use with a transfer machine. A pair of sprockets 1, 2 are located along, and in mesh with, parallel straight or rectilinear sections of chains 3, 4, respectively. The two couples of engaging parts are designed to have an equal length of engagement and maintain the same engaging conditions.

Figure 3:
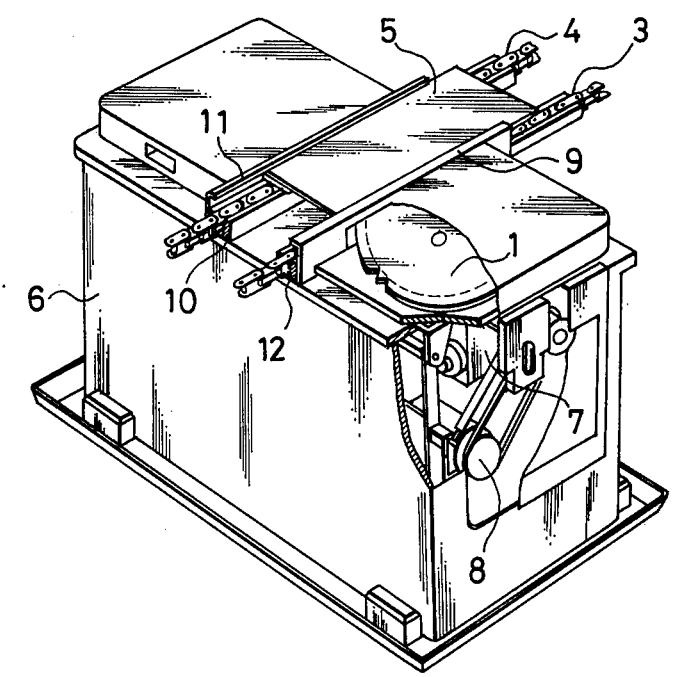
FIG. 3 is a perspective view of the essential parts of the driving mechanism according to the invention, partly broken away to the show the internal construction.

FIG. 3 shows a drive unit with a straight run of a pallet-carrying track. Of the pair of sprockets 1, 2, the right-hand one 1 is shown with its cover partly cut away. Also shown are chains 3, 4 laid apart in parallel and a pallet 5 resting on the chains. Numeral 6 designates the unit body, 7 a reduction gear, and 8 a drive motor. The power from the motor 8 is transmitted through the reduction gear 7 to the pair of sprockets 1, 2, which in turn drive the chains 3, 4 and with them the pallet lying thereover, so that a workpiece on the pallet can be transferred from one machine work station to another.

Figure 4:
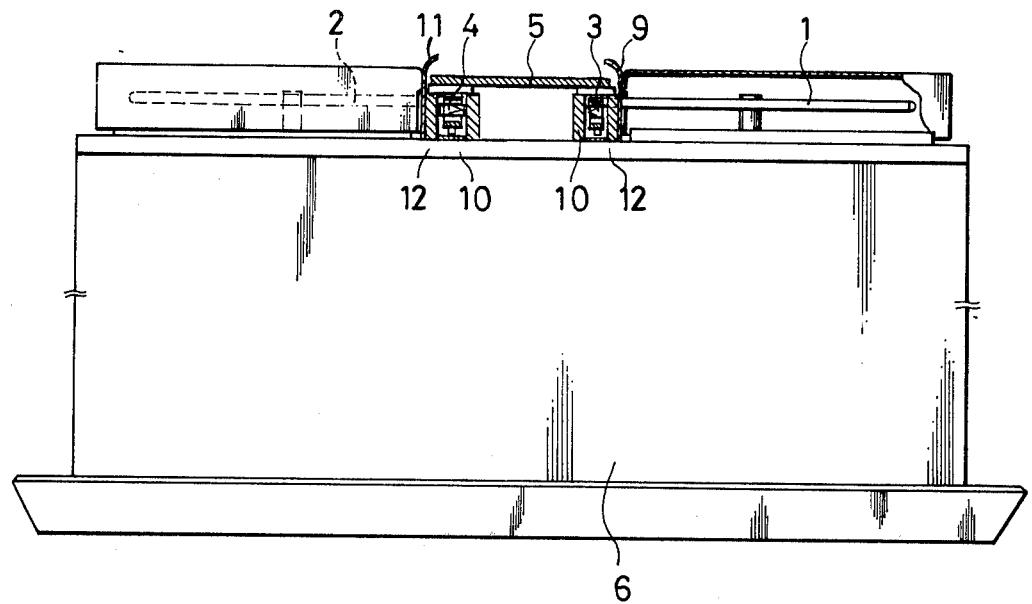
FIG. 4 is an enlarged view, partly in section, of sprockets engaged with chains.

In FIG. 4, which is a detail of the sprockets and chains in engagement, the chains 3, 4 pass between chain guides 10, 12 which keep them in parallel spaced relation. The pallet 5 that lies over the chains 3, 4 is guided at both its edges along guide rails 9, 10, with sufficient clearances therebetween for smooth travel of the pallet together with the chains.

Figure 5:
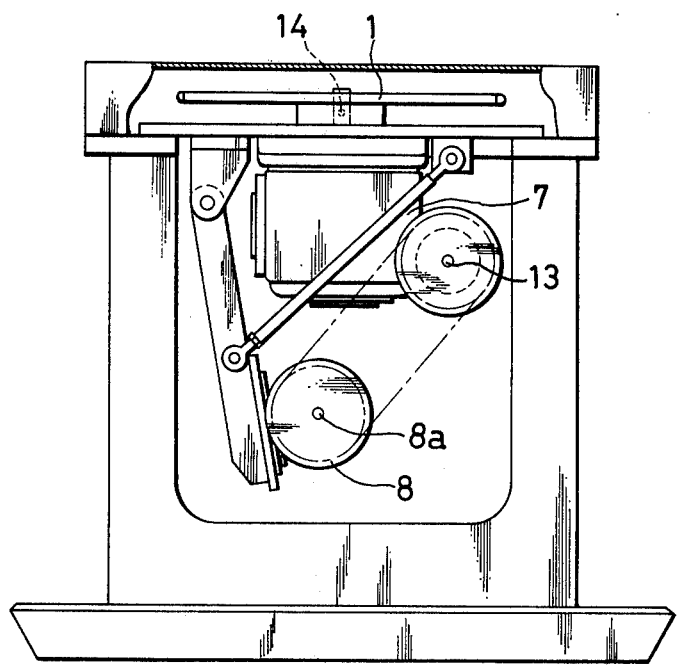
FIG. 5 is an enlarged view of the sprocket driving mechanism with a motor.
Figure 6:
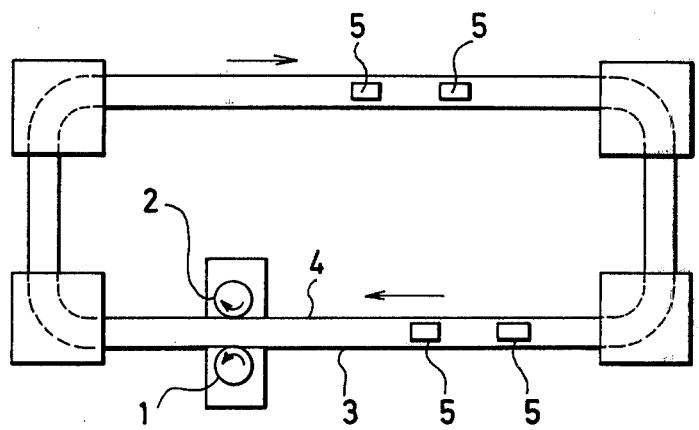
FIG. 6 is a plan view of a workpiece transfer path embodying the invention.

As shown better in FIG. 5, the power from the drive shaft 8a of the motor 8 is first transmitted to an input shaft 13 by endless chain, belt or the like, and thence through the reduction gear 7 to the sprockets 1, 2 mounted on output shafts 14. For example, the speed of the drive motor 8 is decreased by the reduction gear 7 to about 10 rpm in order to drive the sprockets 1, 2. Allowing the sprockets to mesh with the chains 3, 4 over the same distance and maintain constant engaging conditions, the unit forces the chains 3, 4 to run at about 16 meters a minute.

As stated hereinbefore, a pair of chains are driven in their parallel straight or rectilinear sections in accordance with the invention and, therefore, the same conditions of engagement can be maintained between the respective sprockets and chains. This solves the problem of stick-slip, a hindrance to smooth work conveyance, and permits free movement of pallets. An additional advantage is extended life of the sprockets due to equalized wear.

What is claimed is:

1. A chain drive for a transfer machine, operable to transfer work-carrying pallets horizontally between work stations, comprising, in combination, a pair of endless chains extending in spaced parallel relation along a substantially horizontal workpiece transfer path and having rectilinear sections interconnected by bends, said chains supporting work-carrying pallets; and a driving unit in driving engagement with said chains at a location on a rectilinear section of said transfer path intermediate bends thereof; said driving unit comprising at least one pair of toothed sprockets in the same horizontal plane and each engaged with a respective chain, the lengths of engagement of both chains with their associated sprockets being equal to each other and the sprockets having equal diameters and identical tooth pitches; and driving means conjointly rotating both sprockets of each pair at the same speed to drive the two chains at equal speeds.

2. A chain drive according to claim 1 wherein the said sprockets are disposed on the outer sides of the individual chains, on a common plane substantially flush with the chains.

3. A chain drive according to claim 1, in which said driving unit comprises spaced parallel rectilinear chain guides engaging said chains during their travel through said driving unit and maintaining said chains in spaced parallel relation with each other.

4. A chain drive according to claim 3, in which said driving unit comprises spaced parallel rectilinear guide rails guiding pallets through said drive unit.

* * * * *